US005939204A

United States Patent [19]

Czech

[11] Patent Number: 5,939,204

[45] Date of Patent: Aug. 17, 1999

[54] ARTICLE FOR TRANSPORTING A HOT, OXIDIZING GAS

[75] Inventor: Norbert Czech, Dorsten, Germany

[73] Assignee: Siemens Aktiengesellschaft, Munich, Germany

[21] Appl. No.: 09/023,951

[22] Filed: Feb. 17, 1998

Related U.S. Application Data

[63] Continuation of application No. PCT/DE96/01465, Aug. 6, 1996.

[30] Foreign Application Priority Data

| | | | |
|---|---|---|---|
| Aug. 16, 1995 | [DE] | Germany | 195 30 125 |
| Apr. 16, 1996 | [DE] | Germany | 196 15 012 |

[51] Int. Cl.[6] .......... B32B 15/04; C22C 19/05; C22C 19/07; C22C 38/18

[52] U.S. Cl. .......... 428/469; 428/701; 420/34; 420/40; 420/436; 420/438; 420/443; 420/447; 420/449; 420/450

[58] Field of Search .......... 428/469; 420/34, 420/40, 443, 445, 455, 446, 447, 437, 438, 436, 442, 701, 449, 450; 416/241 R

[56] References Cited

U.S. PATENT DOCUMENTS

| | | | |
|---|---|---|---|
| 3,134,670 | 5/1964 | Prosen et al. | 75/171 |
| 3,898,081 | 8/1975 | Kukhar | 75/171 |
| 3,907,555 | 9/1975 | Dudek et al. | 75/171 |
| 4,202,687 | 5/1980 | Murayama et al. | 75/134 C |
| 4,321,310 | 3/1982 | Ulion et al. | 428/612 |
| 4,321,311 | 3/1982 | Strangman | 428/623 |
| 4,451,299 | 5/1984 | Smeggil et al. | 148/1 |
| 4,514,359 | 4/1985 | Andrews | 420/436 |
| 4,806,515 | 2/1989 | Luczak et al. | 502/185 |
| 5,116,691 | 5/1992 | Darolia et al. | 428/614 |
| 5,262,245 | 11/1993 | Ulion et al. | 428/469 |

FOREIGN PATENT DOCUMENTS

| | | |
|---|---|---|
| 0 207 874 A2 | 1/1987 | European Pat. Off. . |
| 0 412 397 A1 | 2/1991 | European Pat. Off. . |
| 0 532 150 A1 | 3/1993 | European Pat. Off. . |

*Primary Examiner*—John J. Zimmerman
*Attorney, Agent, or Firm*—Herbert L. Lerner; Laurence A. Greenberg

[57] ABSTRACT

An article that is used to transport a hot oxidizing gas, in particular a flue gas in a gas turbine, has a surface acted upon by the gas. This surface is formed by an alloy which has 10 to 40 wt. % chrome, 1 to 20 wt. % gallium and optionally other specific elements in a base including at least one element from the group of iron, cobalt and nickel. In the alloy the gallium replaces aluminum and/or silicon. The alloy is deposited especially as a protective layer on a superalloy substrate and optionally coated with a gas-permeable ceramic layer.

22 Claims, No Drawings

ARTICLE FOR TRANSPORTING A HOT, OXIDIZING GAS

CROSS-REFERENCE TO RELATED APPLICATION

This is a continuation of International Application PCT/DE96/01465, filed Aug. 6, 1996 which designated the United States.

BACKGROUND OF THE INVENTION

1. Field of the Invention

The invention relates to a heat-resistant and corrosion-resistant article for transporting a hot, oxidizing gas having a surface to be exposed to the gas, which surface is made of an alloy having the following significant proportions by weight: chromium from 10% to 40%, if desired further elements including aluminum from 0% to 20%, silicon from 0% to 10%, at least one reactive element selected from the group consisting of yttrium, scandium and the rare earth elements, and the balance of at least one element selected from the group consisting of iron, cobalt and nickel.

The invention relates in particular to such an article for transporting a hot, oxidizing gas, where the gas has aggressive properties usually found in a waste gas in a gas turbine; in this context, the invention relates particularly to a structured part which serves to transport a waste gas in a gas turbine. This structural part can be a rotor blade or a guide vane, a heat shield or another highly thermally stressed part of a gas turbine. Particularly appropriate is such a part which in operation transports a waste gas having a mean temperature of more than 1000° C., in particular between 1200° C. and 1400° C.

The alloy in the product is, in particular, an alloy of the type MCrAlY, where M is the major metal base of the alloy and is at least one element-selected from the group consisting of iron, cobalt and nickel, and where the alloy is further characterized by contents of chromium, aluminum or at least one element, selected from the group consisting of scandium, yttrium and the rare earth elements. The alloy of the type MCrAlY can also have contents of further elements, for example rhenium.

The invention also relates to a heat-resistant and corrosion-resistant article including a substrate of a nickel-based or cobalt-based superalloy, for example a gas turbine blade or another highly thermally and chemically stressed structural part of a gas turbine, which part has a protective layer including an alloy of the type mentioned.

Substrates for highly thermally and chemically stressed articles as are installed, in particular, in gas turbines are preferably made of superalloys based on nickel or cobalt by casting or forging, depending on the superalloy used. In casting such a substrate, it may be possible to resort to a technique which is known as "directional solidification" and gives a substrate having an anisotropic and/or spatially oriented microstructure, in particular a single-crystal microstructure. The superalloys which are generally suitable usually have excellent mechanical properties at the temperatures occurring during operation of the articles made therefrom. However, their chemical properties are sometimes such that they require particular measures for protection against corrosion. In order to offer this protection, specific protective layers for superalloys have been developed, in particular the protective layers including alloys of the type MCrAlY.

Typical protective layers of such a type are known from Published European Patent Application 0 412 397 A1. This document describes a protective layer having a high corrosion and oxidation resistance, which is characterized by it having a content of rhenium. Specifically, the protective layer has proportions by weight of the following elements: from 1% to 20% of rhenium, from 22% to 50% of chromium, from 0% to 15% of aluminum, where the proportions by-weight of chromium and aluminum together are at least 25% and at most 53%, from 0.3% to 2% of yttrium or an element equivalent to yttrium and also from 0% to 3% of silicon. The major metal base of the alloy forming the protective layer includes at least one of the elements iron, nickel and cobalt, plus impurities usually resulting from the manufacture in the usual proportions by weight. If desired, the protective layer can also contain proportions by weight of the following elements: hafnium up to 5%, tungsten up to 12%, manganese up to 10%, tantalum up to 5%, titanium up to 5%, niobium up to 4% and zirconium up to 2%. The sum of the proportions by weight of these elements should be at most 15%.

Further compositions for protective layers of alloys of the type MCrAlY are described in Published European Patent Application 0 532 150 A1, where nickel is in each case used as the major metal base of the alloy. Apart from the elements cobalt, chromium and aluminum which are always present, suitable additional elements are rhenium, hafnium, yttrium, silicon, zirconium, carbon and boron. In each case, the proportion by weight of aluminum in such an alloy is between 6% and 12%.

U.S. Pat. No. 4,451,299 describes protective layers of the type MCrAlY or MCrAlHf (Hf represents hafnium which can, under some circumstances, replace yttrium) having proportions by weight of aluminum between 7% and 20%. Nickel, cobalt and iron or mixtures of at least two of these elements are suitable as bases for the alloys described. In addition, proportions by weight of up to 10% of the elements platinum, rhenium, silicon, tantalum and manganese can be present. The protective layers produced from the alloys are said to be suitable for a temperature range between 650° C. and 820° C.

Published European Patent Application 0 207 874 A2 discloses a composition for an alloy containing the following proportions by weight: from 7.5% to 11% of aluminum, from 9% to 16% of chromium, from 2% to 8% of tantalum, from 0% to 25% of cobalt, and a basis which is essentially nickel. Such a protective layer applied to a substrate including an appropriately selected superalloy is said to have a particularly high diffusion stability. The diffusion stability is supposed to include the formation between the substrate and the protective layer applied thereto of only a small diffusion zone in which elements from the substrate mix with elements from the protective layer. As a result, at most an insignificant proportion of the aluminum diffuses from the protective layer into the substrate, which could cause the protective layer to lose the capability of forming a film of aluminum oxide on its surface which is essential to the oxidation resistance.

U.S. Pat. Nos. 4,321,310 and 4,321,311 each relate to a product in the form of a gas turbine component including a substrate of a superalloy; a metallic protective layer of the type MCrAlY applied thereto and, applied to the latter, a ceramic layer having a columnar crystalline structure, which functions as a thermal barrier layer. This thermal barrier layer makes it possible to increase the thermal stressability of the product, since the thermal barrier layer absorbs a high temperature difference and thus prevents the metallic particles of the product from being excessively stressed. The thermal barrier layer is bound to the product through a thin film of aluminum oxide which is formed by surface oxidation of the metallic protective layer. This surface oxidation can be carried out before or after application of the ceramic layer.

U.S. Pat. No. 5,262,245 describes an attempt to modify a superalloy for a product of the type in question in such a way that it is itself capable of forming a thin aluminum oxide film on its surface and thus makes the use of a metallic protective layer for anchoring a ceramic layer, as described above, superfluous.

U.S. Pat. No. 3,134,670 relates to corrosion-protected alloys which are formed mainly of iron, cobalt or nickel and are characterized by an addition of gallium. The alloys are supposed to be used for producing crowns, fillings and the like in dentistry, and also for producing household articles such as cutlery. The addition of gallium is said to improve the cutting and polishing performance of an alloy without impairing its hardness and toughness. The addition of gallium is also supposed to improve the castability of the alloy and to contribute to the formation of a fine-grained microstructure. There is no suggestion that an alloy described be used at particularly high temperatures.

The formation of a protective oxide film on the surface of the protective layer is an important function for an alloy in the context of a product of the type described in the introduction. Since such an oxide film steadily wears off during operation, it requires continual renewal. This renewal occurs through the use of continual oxidation of aluminum which diffuses from the protective layer to the surface, reacts there with oxygen and thus supplements the film. The maximum life of a protective layer is accordingly determined by its aluminum content, since with the loss of aluminum the protective layer loses the capability of forming the protective oxide film, and thus loses its protective action. Thus, a high aluminum content in an alloy for a protective layer is desired in order to give a long life.

However, a high aluminum content leads to embrittlement of the alloy. This is because the aluminum is not stored in the alloy in elemental form, but at least a significant proportion is present in the form of intermetallic compounds, in particular intermetallic compounds of nickel and aluminum or cobalt and aluminum. Accordingly, the aluminum content in an alloy to be used as a protective layer has to be restricted to a particular level. This level is determined by many factors and additions of elements such as rhenium can increase the maximum possible proportion by weight of aluminum in an alloy. As a general guideline, a proportion by weight of aluminum of 15% can be regarded as an upper limit. Such a proportion by weight does require very careful measures for matching the contents of the other elements in the protective layer so as to keep its brittleness within acceptable limits.

Problems similar to those for aluminum also occur in the case of the element silicon which is known as a constituent of protective layers and which likewise can develop a protective oxide film on an alloy. High additions of silicon also embrittle an alloy so that the proportion by weight of silicon also may not exceed a certain limit. The proportion by weight of silicon is therefore usually kept to less than 1% .

SUMMARY OF THE INVENTION

It is accordingly an object of the invention to provide an article for transporting a hot, oxidizing gas, which overcomes the hereinafore-mentioned disadvantages of the heretofore-known articles of this general type and which provides an alternative to the alloy articles known and tested heretofore for transporting hot, oxidizing gases, with the alloy used retaining the advantages achievable by addition of aluminum and/or silicon, particularly the capability of forming a protective oxide film, but avoiding the danger of embrittlement which was always present for the compositions known heretofore.

With the foregoing and other objects in view there is provided, in accordance with the invention, an article for transporting a hot, oxidizing gas having a surface to be exposed to the gas at a temperature of at least 1000° C., which surface is made of an alloy consisting essentially of the following, by weight:

from 10% to 40% of chromium from 1% to –20% of gallium from 0% to 20% of aluminum from 0% to 10% of silicon from 0% to 2% of a reactive element selected from the group consisting of yttrium, scandium and the rare earth elements, from 0% to 5% of hafnium from 0% to 10% of manganese from 0% to 4% of niobium from 0% to 10% of platinum from 0% to 20% of rhenium from 0% to 10% of tantalum from 0% to 5% of titanium from 0% to 12% of tungsten from 0% to 2% of zirconium basis at least one element selected from—the group consisting of iron, cobalt and nickel, provided that the sum of percentages including the percentage of iron, cobalt, and/or nickel is 100%.

The presence in the alloy of the usual proportions of impurities usually resulting from the manufacture of the metal ingredients has to be expected. Examples of such impurities are, without claiming to be exhaustive, phosphorus and sulfur.

The addition according to the invention of gallium to the alloy can ensure a desired oxidation resistance, with the gallium completely or partially replacing the aluminum or silicon always required heretofore. This gives an alloy which, at a proportion by weight of aluminum of significantly below 15%, can have an oxidation resistance at least equal to the oxidation resistance of a known alloy having a proportion by weight of aluminum of more than 15%, while the ductility (the opposite of "brittleness") of the gallium-containing alloy is significantly better.

Like aluminum and silicon, gallium is able to form a protective film of firmly adhering oxide on a surface of the alloy when this surface is exposed to oxygen, particularly at an elevated temperature of at least 1000° C. An advantage in this case is that the gallium which is very volatile in pure form can be incorporated into the alloy as an intermetallic compound and thus can be available even at elevated temperatures for forming a stable oxide on the surface of the alloy.

The proportion by weight of chromium in the alloy of the invention is between 10% and 40%.

The proportion by weight of aluminum in the alloy which forms the surface of the article of the invention is preferably up to 10%. This ensures, in particular that no undesired embrittlement of the alloy by the aluminum can result.

In the case of considerations analogous to those just mentioned, the proportion by weight of silicon in the alloy of the article of the invention is preferably limited to a value of up to 2%.

It is likewise preferred that the alloy of the article contains at least one reactive element selected from the group consisting of yttrium, scandium and the rare earth metals. The reactive element is preferably yttrium and its proportion by weight is up to 2%.

It is likewise preferred that the metal base contains cobalt and/or nickel, but not iron.

Furthermore, the alloy of the article preferably has a content of aluminum so that both gallium and aluminum produce an effect. The proportion by weight of aluminum is preferably up to 10% since the gallium at least partially aids and supplements the action of the aluminum. In this context, the proportion by weight of aluminum is still preferably greater than the proportion by weight of gallium, with the sum of the proportions by weight of aluminum and gallium preferably being up to 20%.

It is generally preferred that the proportion by weight of gallium in the alloy is up to 15%.

Preference is also given to an embodiment of the article in which the alloy has a content of rhenium. The proportion by weight of rhenium is in particular up to 20%, preferably up to 15%.

Another embodiment of the article is distinguished by having a surface which includes a film being formed at least partly of gallium oxide.

With the objects of the invention in view, there is also provided an article distinguished by a novel alloy including a major metal base of nickel and proportions by weight of the following elements: cobalt from 5% to 20%, chromium from 20% to 30%, aluminum from 5% to 12%, gallium from 3% to 8%, yttrium from 0.2% to 1% and rhenium from 0% to 5%. Impurities resulting from manufacture of the metal ingredients can be present; contents of further elements and additives are also possible.

A particularly preferred composition of the novel alloy just described is distinguished by the following proportions by weight: cobalt from 8% to 16%, chromium from 21% to 27%, aluminum from 6% to 10%, gallium from 4% to 6%, yttrium from 0.4% to 0.8%- and rhenium from 2% to 4%.

Each of the alloys described can additionally contain further elements, in particular: hafnium from 0% to 5%, tungsten from 0% to 12%, manganese from 0% to 10%, tantalum from 0% to 5%, titanium from 0% to 5%, niobium from 0% to 4% and zirconium from 0% to 2%.

The alloy in the article of the invention is preferably a protective layer of a metallic substrate, in particular on a substrate including a nickel-based or cobalt-based superalloy. The substrate is in this case, in particular, a structural part for transporting a hot, oxidizing gas, in particular in a gas turbine.

On the protective layer of the article, a further gas-permeable ceramic layer is preferably applied, with this ceramic layer having, in particular, a microstructure composed of columnar crystals. Such a ceramic layer is provided, in particular, as a thermal barrier layer for a product in the form of a structural part for a gas turbine, where the product during operation is exposed to a temperature which significantly exceeds 1000° C. and, depending on the application, can extend to just below the melting point of the substrate. The ceramic layer preferably includes a partially stabilized zirconium oxide, i.e. a material which contains not only zirconium oxide as main constituent but also another oxide, for example lanthanum oxide, cerium oxide, calcium oxide, yttrium oxide or magnesium oxide. The incorporation of the other oxide stabilizes the crystalline structure of the zirconium oxide and prevents the zirconium oxide from undergoing, when heated, a phase transition in which the crystalline structure of the zirconium oxide changes considerably. In addition, the ceramic layer preferably adheres to a film adhering to the surface and containing gallium oxide, which film is formed by oxidation of the alloy prior to or after application of the ceramic layer.

In the case of the substrate on which the alloy is to be applied, preference is given to a composition based on nickel and additional elements in the following proportions by weight: from 0.06% to 0.14% of carbon, from 10% to 20% of chromium, from 6% to 11% of cobalt, from 1% to 3% of molybdenum, from 1% to 6% of tungsten, from 1% to 6% of tantalum, from 0% to 2% of niobium, from 1% of 6% of aluminum, from 1% to 6% of titanium, from 0% to 0.3% of boron and from 0% to 0.2% of zirconium.

Although the invention is illustrated and described herein as embodied in an article for transporting a hot, oxidizing gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the examples given below.

Description of the Preferred Embodiments

Referring now in detail to the examples of the invention, on a substrate in the form of a thermally, mechanically and corrosively highly stressed component of a gas turbine, in particular a turbine blade for a gas turbine which in operation is exposed to a hot waste gas having a temperature of 1300° C. or more, there is applied an alloy as protective layer, with the application being carried out by vacuum plasma spraying followed by customary further treatments. The alloy has a major metal base of nickel and additionally contains the following proportions by weight: 10% of cobalt, 23% of chromium, 8% of aluminum, 5% of gallium, 3% of rhenium and 0.6% of yttrium. The substrate includes a nickel-based superalloy of a conventional type; such superalloys are known by the designations IN 738 and PWA 1483.

Apart from vacuum plasma spraying, other possible ways of applying the protective layer are the various processes known per se of physical vapor deposition (PVD) or chemical vapor deposition (CVD). In particular, a PVD process is used for applying a ceramic layer onto the protective layer.

When during operation, the protective layer is exposed to a waste gas containing oxygen, the protective layer becomes coated with a film which is formed at least partially of gallium oxide. As a result, the protective layer has a significantly increased life and it has a significantly increased ductility compared with a protective layer which contains no gallium but instead a correspondingly increased proportion by weight of aluminum. This makes the gallium-containing protective layer significantly less susceptible to crack formation, which has an additional very positive effect on its life.

As a result of the addition of gallium, a significantly increased alloy life is afforded in comparison with the alloys of the prior art. If the thermal stress on the product is very high during operation, the surface formed by the alloy can be coated with a ceramic layer, preferably a ceramic layer having a microstructure composed of columnar crystals and including partially stabilized zirconium oxide. In particular, the layer is in this case bound to a film containing gallium oxide and formed by oxidation of the alloy, which film adheres to the surface.

I claim:

1. An article for transporting a hot, oxidizing gas having a surface which is to be exposed to the gas and is made of an alloy, consisting essentially of the following, by weight:

from 10% to 40% of chromium from 1% to 20% of gallium from 0% to 20% of aluminum from 0% to 10% of silicon from 0% to 2% of a reactive element selected from the group consisting of yttrium, scandium and the rare earth elements, from 0% to –5% of hafnium, from 0% to 10% of manganese, from 0% to 4% of niobium, from 0% to 10% of platinum, from 0% to 20% of rhenium, from 0% to 10% of tantalum, from 0% to 5% of titanium, from 0% to 12% of tungsten, from 0% to 2% of zirconium, and a balance of at least one element selected from the group consisting of iron, cobalt and nickel.

2. The article according to claim 1, wherein the proportion by weight of aluminum is up to 10%.

3. The article according to claim 1, wherein the proportion by weight of silicon is up to 2%.

4. The article according to claim 1, wherein the reactive element is yttrium.

5. The article according to claim 1, wherein the balance of the alloy contains only cobalt and/or nickel.

6. The article according to claim 1, wherein the alloy contains aluminum.

7. The article according to claim 6, wherein the proportion by weight of aluminum is greater than the proportion by weight of gallium.

8. The article according to claim 6, wherein the sum of the proportions by weight of aluminum and gallium is up to 20%.

9. The article according to claim 1, wherein the proportion by weight of gallium is up to 15%.

10. The article according to claim 1, wherein the proportion by weight of rhenium is up to 15%.

11. The article according to claim 1, wherein the surface includes a film consisting at least partially of gallium oxide.

12. A heat-resistant and corrosion-resistant alloy exposed to a hot oxidizing gas at a temperature of at least 1000° C., consisting essentially of nickel and the following, in proportions by weight:

from 5% to 20% of cobalt from 20% to 30% of chromium from 5% to 12% of aluminum from 3% to 8% of gallium from 0.2% to 1% of yttrium, and from 0% to 5% of rhenium.

13. The alloy according to claim 12, including the following, in proportions by weight:

from 8% to 16% of cobalt from 21% to 27% of chromium from 6% to 10% of aluminum from 4% to 61 of gallium from 2% to 4% of rhenium from 0.4% to 0.8% of yttrium.

14. A heat-resistant and corrosion-resistant article for transporting a hot oxidizing gas, comprising a metallic substrate and a protective layer of an alloy consisting essentially of the following, by weight:

from 10% to 40% of chromium from 1% to 20% of gallium from 0% to 20% of aluminum from 0% to 10% of silicon from 0% to 2% of a reactive element selected from the group consisting of yttrium, scandium and the rare earth elements, from 0% to –5% of hafnium, from 0% to 10% of manganese, from 0% to 4% of niobium, from 0% to 10% of platinum, from 0% to 20% of rhenium, from 0% to 10% of tantalum, from 0% to 5% of titanium, from 0% to 12% of tungsten, from 0% to 2% of zirconium, and a balance of at least one element selected from the group consisting of iron, cobalt and nickel.

15. The article according to claim 14, wherein the metallic substrate comprises a nickel-based or cobalt-based superalloy.

16. The article according to claim 14, wherein a gas-permeable ceramic layer, in particular one having a microstructure composed of columnar crystals, is applied to the surface.

17. The article according to claim 16, wherein the ceramic layer comprises a partially stabilized zirconium oxide.

18. The article according to claim 16, wherein the ceramic layer adheres to a film adhering to the surface and containing gallium oxide.

19. The article according to claim 14, wherein the substrate contains the following, in proportions by weight:

from 0.06% to 0.14% of carbon from 10% to 20% of chromium from 6% to 11% of cobalt from 1% to 3% of molybdenum from 1% to 6% of tungsten from 1% to 6% of tantalum from 0% to 2% of niobium from 1% to 6% of aluminum from 1% to 6% of titanium from 0% to 0.3% of boron from 0% to 0.2% of zirconium, and a balance of nickel.

20. The article according to claim 14, which is a structural part of a gas turbine.

21. The article according to claim 1, wherein the surface is to be exposed to the gas at a temperature of at least 1000° C.

22. The article according to claim 14, wherein the gas to be transported is at a temperature of at least 1000° C.

* * * * *